(12) United States Patent
Anderson et al.

(10) Patent No.: US 11,861,427 B2
(45) Date of Patent: Jan. 2, 2024

(54) POOLED VALIDATOR NODE CONFIGURATION FOR HOSTED BLOCKCHAIN NETWORK

(71) Applicant: Microsoft Technology Licensing, LLC, Redmond, WA (US)

(72) Inventors: Jason Michael Anderson, Snohomish, WA (US); Soumya Desai, Bengaluru (IN); Vrijesh Kothari, Hyderabad (IN); Marc Edward Mercuri, Bothell, WA (US); Yan Huang, Shanghai (CN)

( * ) Notice: Subject to any disclaimer, the term of this patent is extended or adjusted under 35 U.S.C. 154(b) by 758 days.

(21) Appl. No.: 16/671,672

(22) Filed: Nov. 1, 2019

(65) Prior Publication Data

US 2021/0133182 A1   May 6, 2021

(51) Int. Cl.
*G06F 9/54* (2006.01)
*G06F 16/27* (2019.01)
*G06F 16/23* (2019.01)
*G06F 16/953* (2019.01)
(Continued)

(52) U.S. Cl.
CPC .......... *G06F 9/547* (2013.01); *G06F 16/2379* (2019.01); *G06F 16/27* (2019.01); *G06F 16/953* (2019.01); *H04L 9/3239* (2013.01); *H04L 9/50* (2022.05)

(58) Field of Classification Search
CPC ...... G06F 9/547; G06F 16/27; G06F 16/2379; G06F 16/953; H04L 9/3239; H04L 2209/38; H04L 9/50
See application file for complete search history.

(56) References Cited

U.S. PATENT DOCUMENTS

2018/0309567 A1* 10/2018 Wooden .............. G06F 21/6209
2019/0058581 A1    2/2019 Wood et al.
(Continued)

OTHER PUBLICATIONS

Jim Zhang; Consensus Algorithms: PoA,IBFT or Raft?; 17 pages; May 15, 2018; https://www.kaleido.io/blockchain-blog/consensus-algorithms-poa-ibft-or-raft (Year: 2018).*
(Continued)

*Primary Examiner* — Kevin L Young
*Assistant Examiner* — Kimberly L Jordan
(74) *Attorney, Agent, or Firm* — Workman Nydegger

(57) ABSTRACT

The disclosed technology is generally directed to blockchain technology. In one example of the technology, a first transaction node of a hosted permissioned blockchain network is provisioned for a first consortium member of the hosted permissioned blockchain network. A shared pool of validator nodes of the hosted permissioned blockchain network is provisioned. The shared pool of validator nodes includes at least one validator node. The shared pool of validator nodes is shared among the plurality of consortium members. The validator nodes of the shared pool of validator nodes are configured for blockchain transaction validation based on a BFT consensus protocol. A second transaction node of the hosted permissioned blockchain network is provisioned for a second consortium member of the hosted permissioned blockchain network. Each transaction node of the hosted permissioned blockchain network is separate from each validator node of the hosted permissioned blockchain network.

20 Claims, 5 Drawing Sheets

(51) Int. Cl.
*H04L 9/32* (2006.01)
*H04L 9/00* (2022.01)

(56) References Cited

U.S. PATENT DOCUMENTS

2019/0146847 A1* 5/2019 Gibson ................. G06F 9/5011
                                                        718/104
2019/0370793 A1* 12/2019 Zhu .................... G06Q 20/3678
2021/0099294 A1* 4/2021 Guo ................. G06Q 20/38215

OTHER PUBLICATIONS

"International Search Report and Written Opinion Issued in PCT Application No. PCT/US2020/056237", dated Feb. 2, 2021, 10 Pages.
Yin, et al., "HotStuff: BFT Consensus in the Lens of Blockchain", In Repository of arXiv:1803.05069v6, Jul. 23, 2019, 23 Pages.
"Istanbul Byzantine Fault Tolerance", Retrieved from: https://github.com/ethereum/EIPs/issues/650, Jun. 22, 2017, 39 Pages.

* cited by examiner

POOLED VALIDATOR NODE CONFIGURATION FOR HOSTED BLOCKCHAIN NETWORK

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to blockchain technology. In one example of the technology, a first transaction node of a hosted permissioned blockchain network is provisioned for a first consortium member of a plurality of consortium members of the hosted permissioned blockchain network. In some examples, a shared pool of validator nodes of the hosted permissioned blockchain network is provisioned. In some examples, the shared pool of validator nodes includes at least one validator node. In some examples, the shared pool of validator nodes is shared among the plurality of consortium members of the hosted permissioned blockchain network. In some examples, the validator nodes of the shared pool of validator nodes are configured for blockchain transaction validation based on a *byzantine* fault tolerance (BFT) consensus protocol. In some examples, a second transaction node of the hosted permissioned blockchain network is provisioned for a second consortium member of the plurality of consortium members of the hosted permissioned blockchain network. In some examples, each transaction node of the hosted permissioned blockchain network is separate from each validator node of the hosted permissioned blockchain network.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
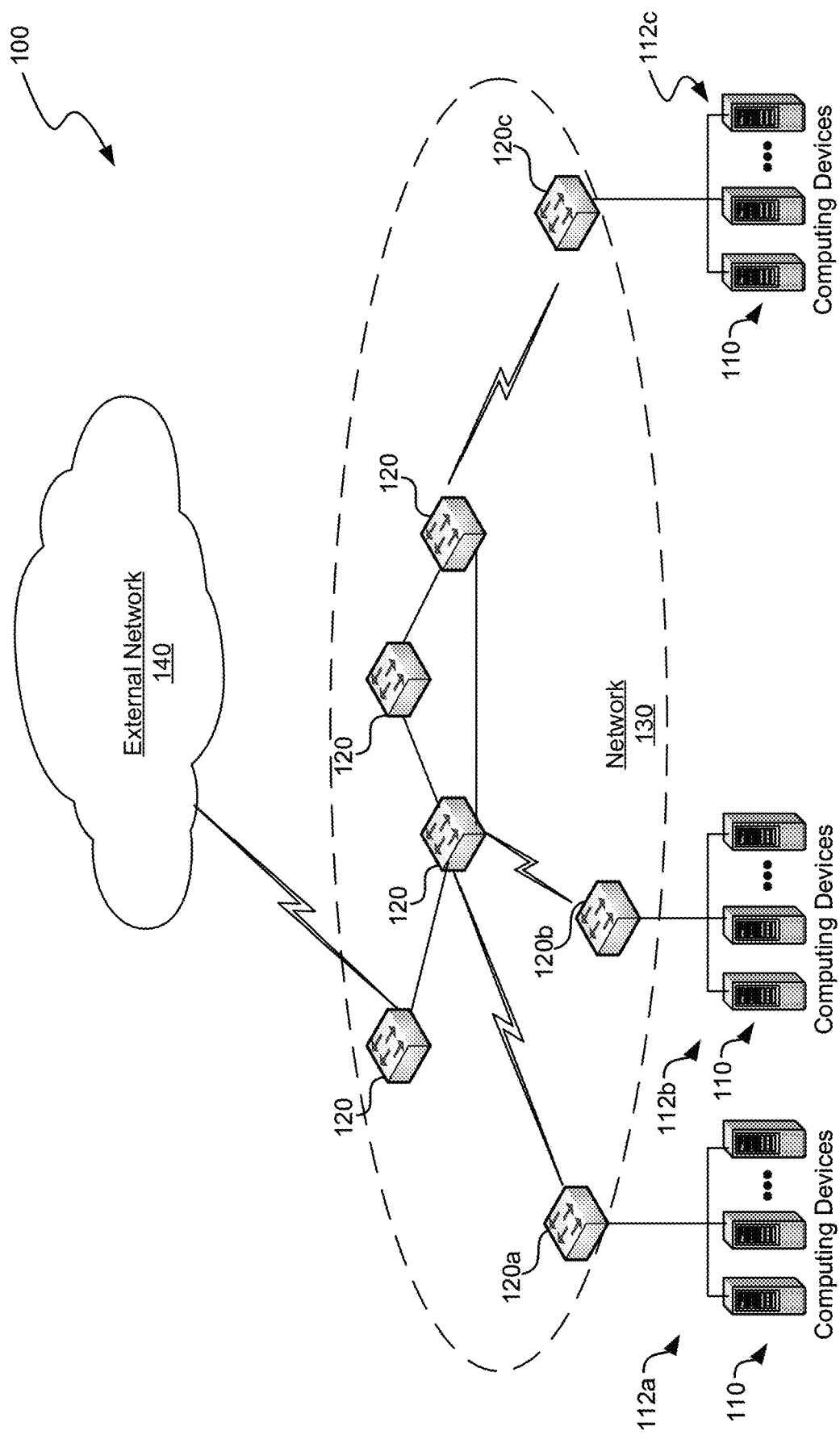
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to blockchain technology. In one example of the technology, a first transaction node of a hosted permissioned blockchain network is provisioned for a first consortium member of a plurality of consortium members of the hosted permissioned blockchain network. In some examples, a shared pool of validator nodes of the hosted permissioned blockchain network is provisioned. In some examples, the shared pool of validator nodes includes at least one validator node. In some examples, the shared pool of validator nodes is shared among the plurality of consortium members of the hosted permissioned blockchain network. In some examples, the validator nodes of the shared pool of validator nodes are configured for blockchain transaction validation based on a *byzantine* fault tolerance (BFT) consensus protocol. In some examples, a second transaction node of the hosted permissioned blockchain network is provisioned for a second consortium member of the plurality of consortium members of the hosted permissioned blockchain network. In some examples, each transaction node of the hosted permissioned blockchain network is separate from each validator node of the hosted permissioned blockchain network.

In some examples, a hosted service is capable of hosting managed, cloud-hosted permissioned blockchain networks for clients.

In the background art, each consortium member of a permissioned blockchain network typically has one or more validator nodes. Typically, during normal operations, the validator nodes validate and process submitted blockchain transactions, and execute blockchain logic, as well as performing functions such as participating in the governance of the blockchain network. The validation of transactions may include confirming transactions through a consensus protocol.

In some examples of the disclosed blockchain network, the blockchain network provides validator nodes and transaction nodes as separate discrete devices. The validator nodes in the shared pool of validator nodes may confirm blockchain transactions using a consensus protocol. A *byzantine* fault tolerance (BFT) mechanism, such as Istanbul BFT (IBFT), or another suitable BFT mechanism, may be used as the consensus mechanism for the permissioned blockchain network.

When a first consortium member begins a permissioned blockchain network, in some examples, the hosted service provisions a transaction node for the consortium member, and provisions a shared pool of validator nodes. When subsequent new consortium members join the permissioned blockchain network, in some examples, a transaction node is added for the new consortium member, but no new validator nodes are provisioned. In some examples, all consortium members of the permissioned blockchain share the shared pool of validator nodes.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112*a*-112*c*. In the illustrated example, each of host sets 112*a*-112*c* is operatively coupled to a corresponding network node 120*a*-120*c*, respectively, which are commonly referred to as "top-of-rack" or "TOR" network nodes. TOR network nodes 120*a*-120C can then be operatively coupled to additional network nodes 120 to form a computer network in a hierarchical, flat, mesh, or other suitable types of topology that allows communications between computing devices no and external network 140. In other examples, multiple host sets 112*a*-112C may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
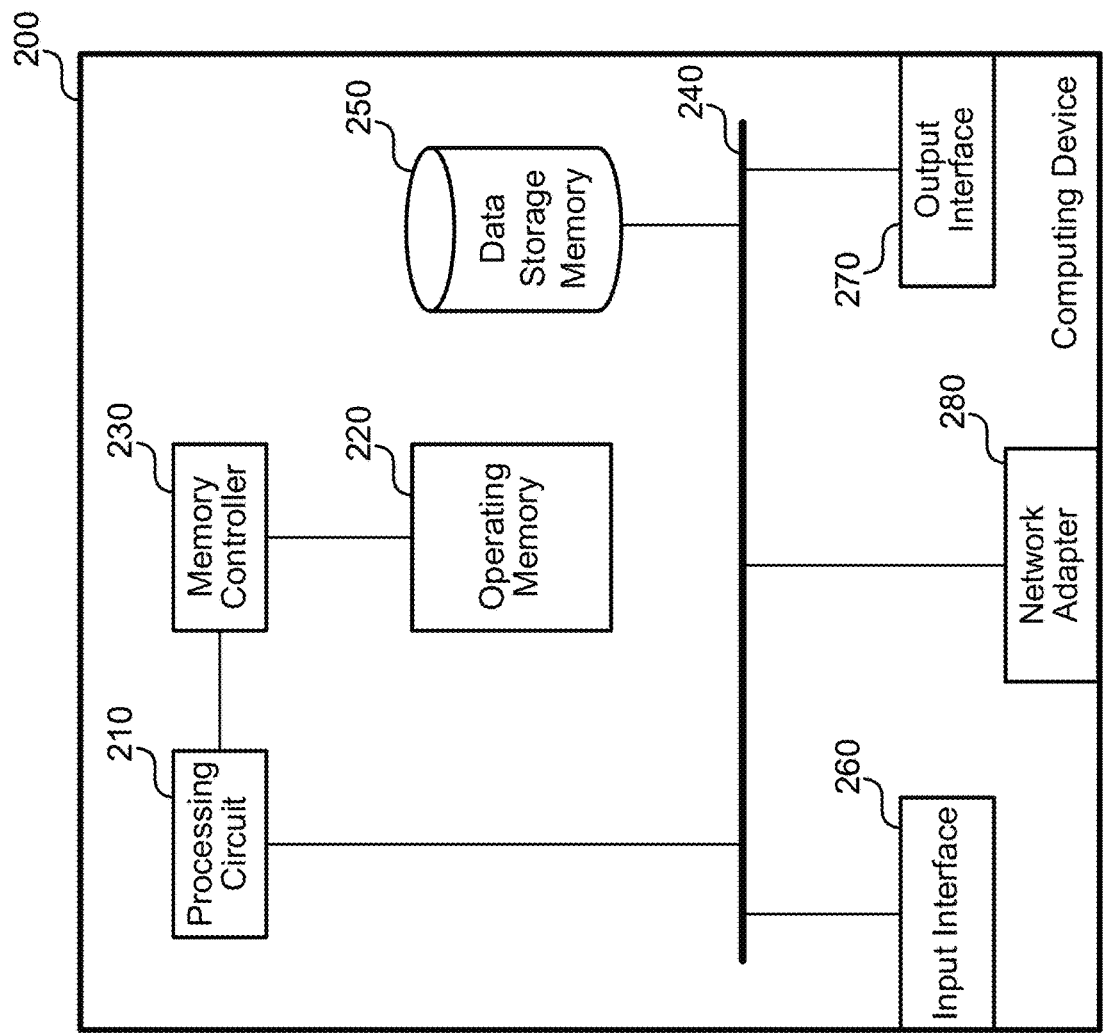
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices, nodes, members, or other entities illustrated in or referred to in various figures, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions, such as, for example, one or more of the processes discussed in greater detail below.

Illustrative Systems

Figure 3:
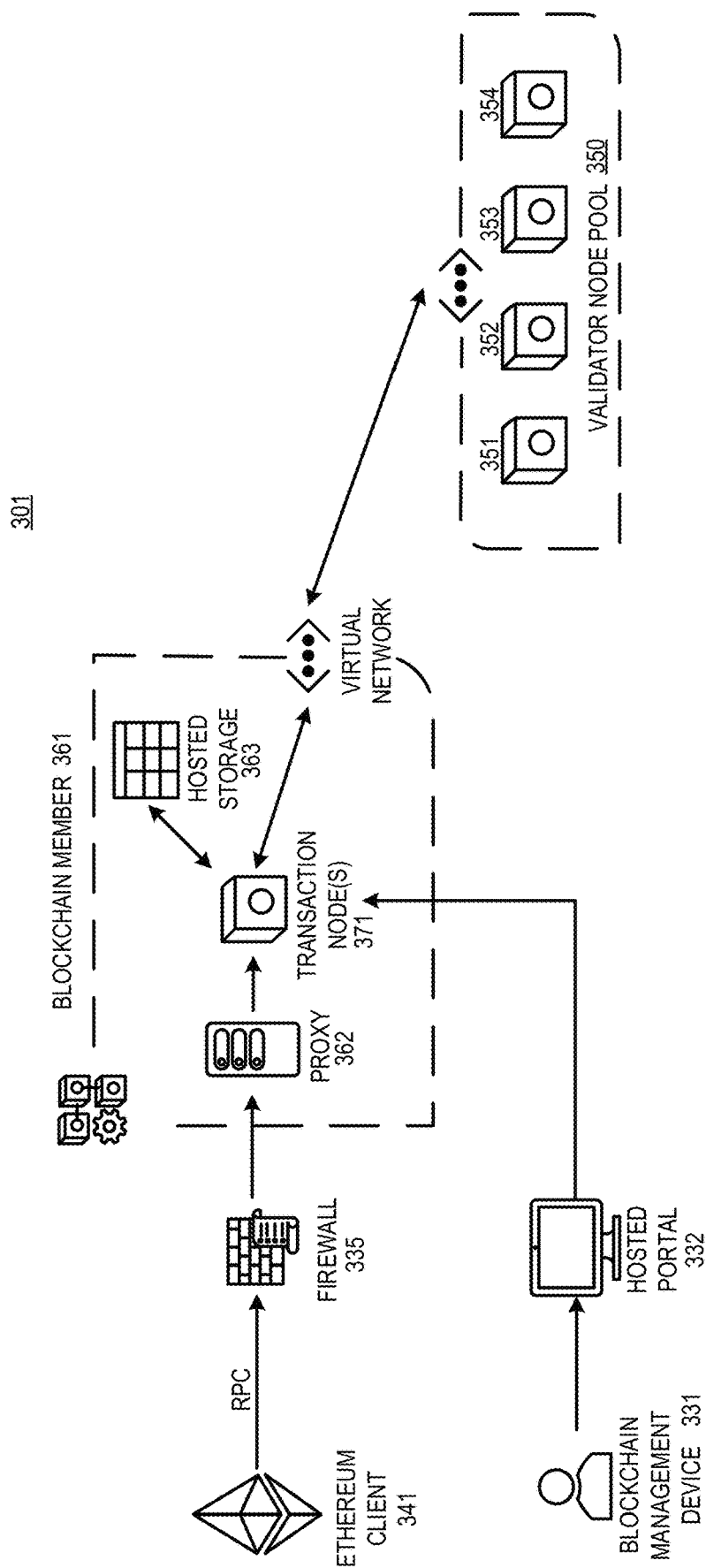
FIG. 3 is a block diagram illustrating an example of a portion of a hosted blockchain service architecture.

FIG. 3 is a block diagram illustrating an example of a portion (301) of a hosted blockchain service architecture. Portion 301 may include client device 341, firewall 335, blockchain member 361, blockchain management device 331, hosted portal 332, and shared validator node pool 350. Shared validator node pool 350 may include validator nodes, such as validator nodes 351-354. Blockchain member 361 may include proxy 362, transaction node 371, and hosted storage 363. Client device 341 may be an Ethereum client in some examples.

Client device 341, blockchain management device 331, transaction node 371, and the validator nodes in shared validator node pool 350 may include examples of computing device 200 of FIG. 2. Various components of FIG. 3 may include or be a part of a distributed system of devices, where the devices in the distributed system may include examples of computing device 200 of FIG. 2. FIG. 3 and the corresponding description of FIG. 3 in the specification illustrates an example system for illustrative purposes that does not limit the scope of the disclosure.

Blockchain management device 331 may be part of a distributed system controlled by a hosted blockchain service. Client device 341 may be a device controlled by a client of the hosted blockchain service. Blockchain member 361 may be part of the hosted blockchain service, where blockchain member 361 is provisioned and hosted by the hosted blockchain service on behalf of the client. Blockchain management device 331 may host transaction node 371 via host portal 332.

In some examples, transaction node 371 has an exposed remote procedure call (RPC) endpoint for which it is possible to send transactions to. Accordingly, client device 341 may communicate with transaction node 371 of blockchain member 361 via proxy 362 via a remote procedure call (RPC). Blockchain member 361 may be protected from unauthorized communication via firewall 335. Client device 341 may accordingly control hosted transaction node 371 via proxy 362. Transaction node 371, hosted by the blockchain host service, may host storage 363, and communicate with shared validator node pool 350.

In some examples, unlike transaction node 371, the validator nodes in shared validator node pool 350 do not have an exposed RPC endpoint. In some examples, the validator nodes are only accessible by the host the clients cannot access the validator nodes, not even remotely. In some examples, clients cannot change settings, install software, or the like on the validator nodes. In some examples, each client has access only to the RPC endpoint of its transaction node.

In some examples, client device 341 can change various configuration settings of transaction node 371 via the management plane, via making a request to the host, which can make the change via the management plane of blockchain management device 331 and hosted portal 332.

Although FIG. 3 shows one transaction node, transaction node 361, in blockchain member 361, in some examples, a blockchain member 361 may have more than one transaction node in blockchain member 361. In general, each blockchain member may have multiple transaction nodes each belonging to the same consortium member.

In the architecture of FIG. 3, in some examples, validator nodes and transaction nodes are separate device. Further, in the architecture of FIG. 3, in some examples, each consortium member of a blockchain network has its own blockchain member, where each blockchain member contains at least one transaction node, and the consortium member can access the blockchain member via the exposed RPC endpoint of the transaction node(s) in the blockchain member. In some examples, the validator nodes are not included in any of the blockchain member. Rather, in some examples, the validator nodes act as a shared pool of validator nodes shared among the consortium members and that are managed by the host. In some examples, the provisioning and management of blockchain members and the validator nodes is provided by a resource provider that is under the control of the host, where the resource provider may be a distributed system.

Figure 4:
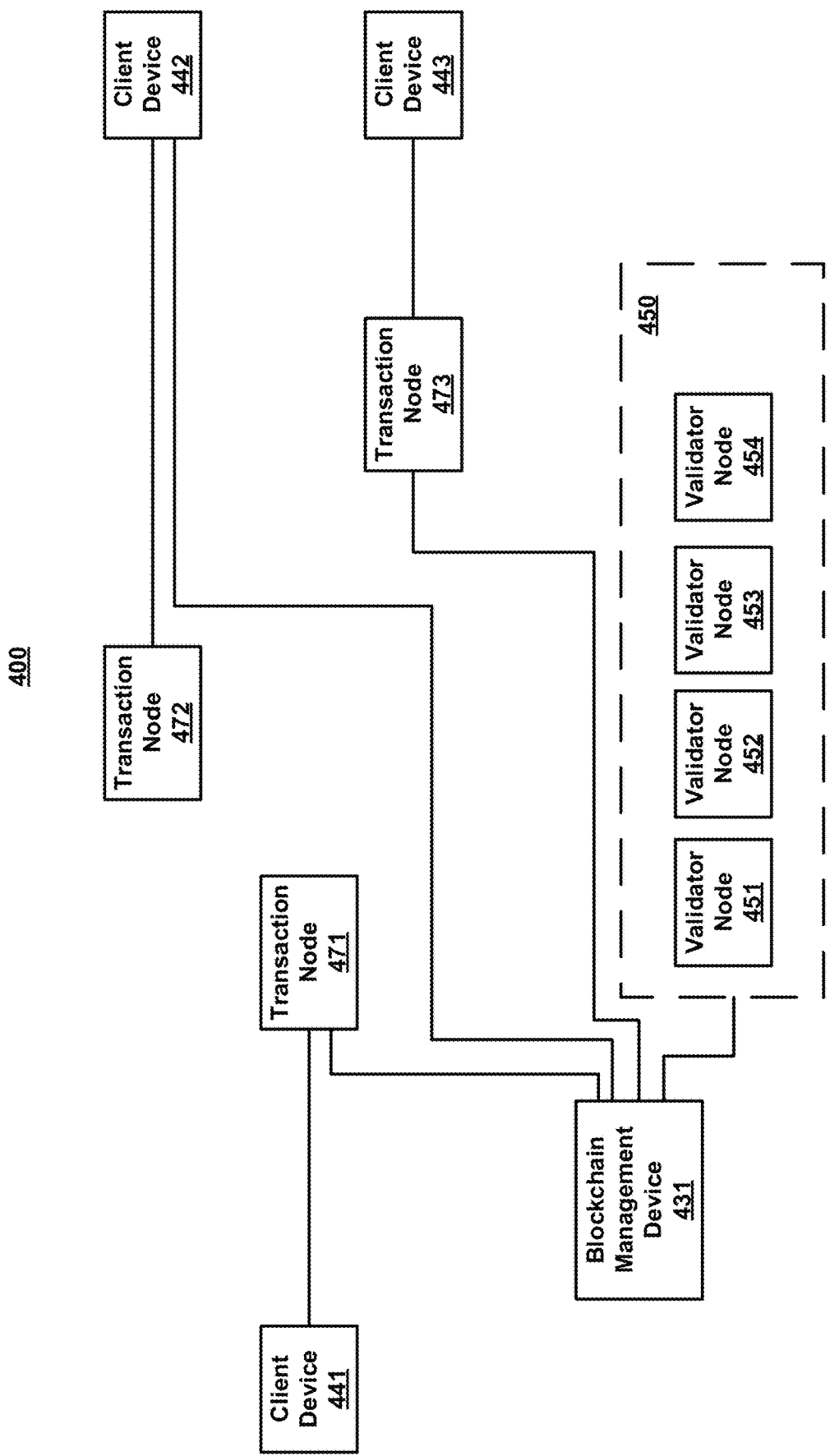
FIG. 4 is a block diagram illustrating an example of a system.

FIG. 4 is a block diagram illustrating an example of system 400. System 400 may include client device 441-443, blockchain management device 431, transaction nodes 471-473, and shared validator node pool 450. Shared validator node pool 450 may include validator nodes such as validator nodes 451-454.

Blockchain management device 431 may be part of a distributed system controlled by a hosted blockchain service that hosts managed, cloud-hosted permissioned blockchain networks for clients. Client devices 441-443 may be a device controlled by clients of the hosted blockchain service. Blockchain management device 431 may host transaction nodes 471-473 and shared validator node pool 450.

In some examples of system 400, functions that are typically performed by a validator node are instead separated so that there are separate validator nodes and transaction nodes, with the transaction nodes being devices that are separate and discrete from the validator nodes. In some examples, the transaction nodes are separate and discrete physical devices from the validator nodes. In some examples, the transaction nodes are separate and discrete virtual devices from the validator nodes.

The transaction nodes may receive and process blockchain transaction for the cloud-hosted permissioned blockchain network. The transaction nodes may also respond to queries to the data, enabling a transaction to be viewed by an authorized party. The validator nodes may confirm blockchain transactions for the cloud-hosted permissioned blockchain network using a BFT consensus protocol and commit validated transactions to the blockchain. In some examples, the transaction nodes perform blockchain transactions, but do not commit transactions to the blockchain. In some examples, blockchain transactions are committed by the validator nodes upon validation based on consensus as determined by the consensus protocol. "Committing the blockchain transactions" refers to committing the transactions to the blockchain.

In some examples, the provisioning and management of blockchain members and the validation pools is provided by a resource provider that is under the control of the host, where the resource provider may be a distributed system. In some examples, the resource provider provides cloud-hosted permissioned Quorum-based blockchain networks using the IBFT consensus mechanism in a virtual machine environment. In some examples, when a client begins a permissioned blockchain network as the first consortium member of the blockchain, the resource provider of the hosted service provisions both a transaction node for the consortium member, and provisions a shared pool of validator nodes.

In some examples, the consensus mechanism may be a suitable BFT consensus mechanism other than IBFT. In some examples, although the blockchain networks are Quorum-based, the networks vary from known Quorum-based networks in various ways, such as using transaction nodes that are separate from validator nodes, by using a shared pool of validator nodes, and/or in other ways discussed herein. In some examples, the network may be based on a suitable platform other than Quorum, such as Hyperledger Besu, as but one example.

In some examples, the number of validator nodes used in a permissioned blockchain network hosted by the hosted service varies depending on factors such as fault tolerance and the type of consensus protocol used. In some examples, with regard the IBFT consensus protocol, the IBFT protocol ensures network consensus in the event that no more than ⅓ of the number of validator nodes minus one is faulty, where "faulty" is defined as either a node failure (e.g., a node crashing) or a node acting in a malicious manner (e.g., forging a transaction). In some examples, because each of the validator node is managed by the hosted service, however, there is no risk of a malicious node, and thus it only need be ensured that node more than ⅓ of the number of validator nodes minus one does not have a node failure—the IBFT formula is unchanged, but the possible causes of a faulty node are reduced.

In some examples, to guard against N failures, 1+N*3 validator nodes are used, such as 1 node for zero failures, 4 nodes for one failure, and 7 nodes for two failures. Accordingly, in some examples, when a new cloud-hosted permissioned blockchain network is being set up, the hosted service may determine the fault tolerance of the client, and provision the number of validator nodes in the shared validator node pool for the cloud-hosted permissioned blockchain network accordingly. In some examples, the available options for the cardinality of validator nodes in the shared validator node pool are 1 validator node, 4 validator nodes, or 7 validator nodes. In other examples, 4 validator nodes are always used, rather than providing an option. In some examples, the possibility of 1 validator node may be provided if the user wishes to use the network for the purpose of development and testing. In some examples, a greater number of validator nodes may also be selected, such as 10 validator nodes, 13 validator nodes, and so on.

In some examples, because there is no risk of a malicious node, there is reduced need to be able to sustain a large number of faults in the blockchain network, so that sustaining more than two faults is unnecessary, so that no more than 7 validator nodes are necessary.

In some examples, using a number of validator nodes other than 1+N*3 validator nodes is a waste of resources, because additional nodes are being used without contributing to the fault tolerance. Furthermore, in IBFT, use of 2, 3, or 6 validator nodes may result in a deadlocked state in which consensus cannot be reached on a transaction, and, accordingly, use of 1+N*3 may also be worthwhile in terms of preventing such a deadlocked state from occurring.

When subsequent new consortium members join the permissioned blockchain network, in some examples, a transaction node is provisioned for the new consortium member, but no new validator nodes are provisioned. In some examples, all consortium members of the permissioned blockchain network share the shared pool of validator nodes, with the shared pool of validator node being managed by the host.

In some examples, each consortium member of the permissioned blockchain network has access to its own transaction node, which is hosted by the blockchain host service. In some examples, while each consortium member of the permissioned blockchain network has access to its own transaction node, each consortium member has zero access to any of the validator nodes, which are instead accessible only by the host service. In other examples, one or more consortium members may have limited access to one or more of the validator nodes in terms of being able to monitor the metrics and/or logs of one or more validator nodes, while still not being able to exercise any control or management over any of the validator nodes. In these examples, one or more consortium members can receive information about the validator nodes, but cannot effect any changes in any of the validator nodes.

In some examples, the initial consortium members of the consortium blockchain network agree on certain parameters of the blockchain network. In some examples, the initial consortium members may determine various parameters, which other prospective consortium members must agree to as a condition to joining the network. In other examples, the parameters may be determined by agreement of all of the founding consortium members of the network.

Once the network has been established, including the provisioning of the transaction node for each consortium member of the consortium network and the provisioning of each validator node in the shared validator node pool, normal operation of the blockchain network may proceed. During operation of the blockchain network, transactions may be submitted by participants. Participants are participants in that they may submit blockchain transactions to the blockchain network, and can see transactions that they are authorized to see, but participants are not necessarily members of the consortium. In some examples, participants that are not consortium members do not have the privileges that are reserved by members of the consortium, such as voting rights. In some examples, participants are approved to join by the consortium members. Some or all of the consortium members may also be participants, but need not be.

During operation of the blockchain network, the transaction nodes may process blockchain transactions, which may be received from participant devices. In some examples, transactions are processed by the transaction nodes in the blockchain network. In some examples, processed transactions are validated by the validator nodes in the blockchain network based on the consensus protocol. The validation may include confirming and signing of transactions, where the consensus protocol is used to determine whether consensus has been achieved in the confirmation of a transaction. In some examples, after a transaction is validated based on the consensus protocol, the transaction is committed to the blockchain.

During operation of the blockchain network, the transaction nodes may also respond to blockchain queries from participants.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
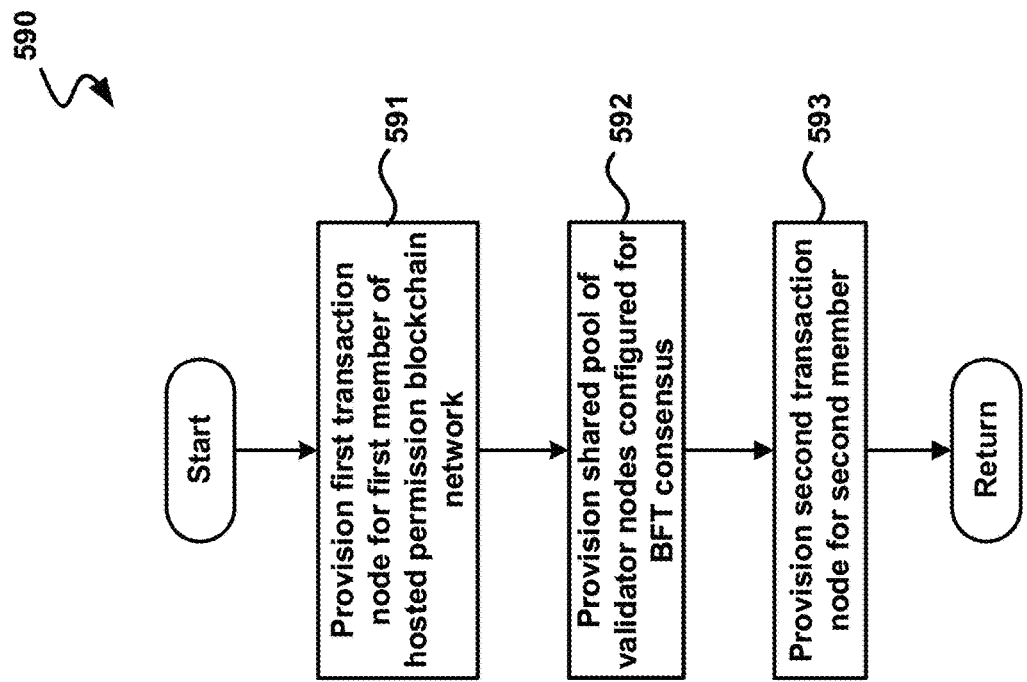
FIG. 5 is a diagram illustrating an example dataflow for a process, in accordance with aspects of the present disclosure.

FIG. 5 is a diagram illustrating an example dataflow for a process (590) for a blockchain system. In some examples, the process of FIG. 5 is performed by a distributed system controlled by a host service to provide cloud-hosted permissioned blockchain networks to clients. In the illustrated example, step 591 occurs first. At step 591, in some examples, a first transaction node of a hosted permissioned blockchain network is provisioned for a first consortium member of a plurality of consortium members of the hosted permissioned blockchain network.

As shown, step 592 occurs next in some examples. At step 592, in some examples, a shared pool of validator nodes of the hosted permissioned blockchain network is provisioned. In some examples, the shared pool of validator nodes includes at least one validator node. In some examples, the shared pool of validator nodes is shared among the plurality of consortium members of the hosted permissioned blockchain network. In some examples, the validator nodes of the shared pool of validator nodes are configured for blockchain transaction validation based on a *byzantine* fault tolerance (BFT) consensus protocol.

As shown, step 593 occurs next in some examples. At step 593, in some examples, a second transaction node of the hosted permissioned blockchain network is provisioned for a second consortium member of the plurality of consortium members of the hosted permissioned blockchain network. In some examples, each transaction node of the hosted permissioned blockchain network is separate from each validator node of the hosted permissioned blockchain network. The processing may then proceed to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a processor; and
a processor-readable storage medium having stored thereon processor-executable code that, upon execution by the processor, causes the processor to perform actions, including:
provisioning a first transaction node of a plurality of transaction nodes of a hosted permissioned blockchain network for a first consortium member of a plurality of consortium members of the hosted permissioned blockchain network;
provisioning a shared pool of validator nodes of the hosted permissioned blockchain network, wherein the shared pool of validator nodes includes at least one validator node, wherein the shared pool of validator nodes is shared among the plurality of consortium members of the hosted permissioned blockchain network, and wherein the validator nodes of the shared pool of validator nodes are configured for blockchain transaction validation based on a byzantine fault tolerance (BFT) consensus protocol; and
provisioning a second transaction node of the plurality of transaction nodes of the hosted permissioned blockchain network for a second consortium member of the plurality of consortium members of the hosted permissioned blockchain network,
wherein each transaction node of the hosted permissioned blockchain network is separate from each validator node of the hosted permissioned blockchain network, wherein the first consortium member is enabled to communicate with the first transaction node via an exposed remote procedure call (RPC) endpoint of the first transaction node and the second consortium member is enabled to communicate with the second transaction node via an exposed RPC endpoint of the second transaction node, and wherein each validator node in the shared pool of validator nodes do not have an exposed RPC endpoint, preventing the first consortium member and the second consortium member from communicating with the shared pool of validator nodes.

2. The apparatus of claim 1, wherein the BFT consensus protocol is an Istanbul byzantine fault tolerance consensus protocol.

3. The apparatus of claim 1, wherein the hosted permissioned blockchain network uses at least one of a Quorum-based blockchain platform or a Hyperledger-Besu-based blockchain platform.

4. The apparatus of claim 1, wherein the apparatus is part of a distributed system that operates as a resource provider.

5. The apparatus of claim 1, the actions further including:
receiving a request for a first blockchain transaction;
via at least one of the plurality of transaction nodes of the hosted permissioned blockchain network, performing the first blockchain transaction;
via the shared pool of validator nodes, performing validation on the first blockchain transaction based on the BFT consensus protocol; and
responsive to successful validation of the first blockchain transaction based on the BFT consensus protocol, via the shared pool of validator nodes, committing the first blockchain transaction.

6. The apparatus of claim 5, the actions further including:
receiving a blockchain query associated with the hosted permissioned blockchain network; and
via at least one of the plurality of transaction nodes of the hosted permissioned blockchain network, responding to the hosted permissioned blockchain network.

7. The apparatus of claim 1, wherein provisioning the shared pool of validator nodes is accomplished such that a cardinality of the shared pool of validator nodes is 3N+1, wherein N is a non-negative integer.

8. The apparatus of claim 7, the actions further including:
querying the first consortium member for a minimum acceptable fault tolerance of validator nodes; and
receiving, from the first consortium member, the minimum acceptable fault tolerance of validator nodes for the first consortium member, wherein provisioning the shared pool of validator nodes is accomplished such that N is the minimum acceptable fault tolerance of validator nodes.

9. A method, comprising:
managing a cloud-hosted permissioned blockchain network that includes transaction nodes for consortium members of the cloud-hosted permissioned blockchain network, and further includes a shared pool of validator nodes, wherein each transaction node of the cloud-hosted permissioned blockchain network is separate from each validator node of the cloud-hosted permissioned blockchain network, wherein a first consortium member of the consortium members is enabled to communicate with a first transaction node of the transaction nodes via an exposed remote procedure call (RPC) endpoint of the first transaction node and a second consortium member of the consortium members is enabled to communicate with a second transaction node of the transaction nodes via an exposed RPC endpoint of the second transaction node, and wherein each validator node in the shared pool of validator nodes do not have an exposed RPC endpoint, preventing the first consortium member and the second consortium member from communicating with the shared pool of validator nodes,
wherein managing the cloud-hosted permissioned blockchain network includes:
via at least one of the transaction nodes of the cloud-hosted permissioned blockchain network, responsive to receiving requests for blockchain transactions, performing the blockchain transactions;
via the validator nodes of the shared pool of validator nodes, performing validation on the performed blockchain transactions based on a byzantine fault tolerance (BFT) consensus protocol; and
via the validator nodes of the shared pool of validator nodes, responsive to successful validation of the blockchain transactions based on the BFT consensus protocol, committing the blockchain transactions.

10. The method of claim 9, wherein the BFT consensus protocol is an Istanbul byzantine fault tolerance consensus protocol.

11. The method of claim 9, further comprising:
receiving a blockchain query associated with the cloud-hosted permissioned blockchain network; and
via at least one of the transaction nodes of the cloud-hosted permissioned blockchain network, responding to the blockchain query.

12. The method of claim 9, further comprising:
provisioning the transaction nodes of the cloud-hosted permissioned blockchain network; and
provisioning the shared pool of validator nodes of the cloud-hosted permissioned blockchain network.

13. The method of claim 12, wherein provisioning the shared pool of validator nodes is accomplished such that a cardinality of the shared pool of validator nodes is 3N+1, wherein N is a non-negative integer.

14. The method of claim 9, wherein the cloud-hosted permissioned blockchain network uses at least one of a Quorum-based blockchain platform or a Hyperledger-Besu-based blockchain platform.

15. The method of claim 9, further comprising:
receiving a request for a first blockchain transaction;
via at least one of the transaction nodes of the cloud-hosted permissioned blockchain network, performing the first blockchain transaction;
via the shared pool of validator nodes, performing validation on the first blockchain transaction based on the BFT consensus protocol; and
responsive to successful validation of the first blockchain transaction based on the BFT consensus protocol, via the shared pool of validator nodes, committing the first blockchain transaction.

16. A processor-readable storage medium, having stored thereon processor-executable code that, upon execution by at least one processor, enables actions, comprising:
hosting a first blockchain member of a hosted permissioned blockchain network for a first consortium member of a plurality of consortium members of the hosted permissioned blockchain network, wherein the first blockchain member includes a first transaction node of a plurality of transaction nodes of the hosted permissioned blockchain network;
hosting a shared pool of validator nodes of the hosted permissioned blockchain network, wherein the shared pool of validator nodes includes at least one validator node, wherein the shared pool of validator nodes is shared among the plurality of consortium members of the hosted permissioned blockchain network, and wherein each validator node of the shared pool of validator nodes is configured for blockchain transaction validation based on a byzantine fault tolerance (BFT) consensus protocol; and
hosting a second blockchain member of the hosted permissioned blockchain network for a second consortium member of the plurality of consortium members of the hosted permissioned blockchain network, wherein the second blockchain member includes a second transaction node of the plurality of transaction nodes of the hosted permissioned blockchain network,
wherein each transaction node of the hosted permissioned blockchain network is separate from each validator node of the hosted permissioned blockchain network, wherein the first consortium member is enabled to communicate with the first transaction node via an exposed remote procedure call (RPC) endpoint of the first transaction node and the second consortium member is enabled to communicate with the second transaction node via an exposed RPC endpoint of the second transaction node, and wherein each validator node in the shared pool of validator nodes do not have an exposed RPC endpoint, preventing the first consortium member and the second consortium member from communicating with the shared pool of validator nodes.

17. The processor-readable storage medium of claim 16, wherein the BFT consensus protocol is an Istanbul byzantine fault tolerance consensus protocol.

18. The processor-readable storage medium of claim 16, the actions further comprising:
receiving a request for a first blockchain transaction;
via at least one of the plurality of transaction nodes of the hosted permissioned blockchain network, performing the first blockchain transaction;

via the shared pool of validator nodes, performing validation on the first blockchain transaction based on the BFT consensus protocol; and responsive to successful validation of the first blockchain transaction based on the BFT consensus protocol, via the shared pool of validator nodes, committing the first blockchain transaction.

19. The processor-readable storage medium of claim 18, the actions further comprising:

receiving a blockchain query associated with the hosted permissioned blockchain network; and via at least one of the plurality of transaction nodes of the hosted permissioned blockchain network, responding to the blockchain query.

20. The processor-readable storage medium of claim 16, wherein the hosted permissioned blockchain network uses at least one of a Quorum-based blockchain platform or a Hyperledger-Besu-based blockchain platform.

* * * * *